United States Patent
Graves et al.

(10) Patent No.: US 6,918,537 B2
(45) Date of Patent: Jul. 19, 2005

(54) SYSTEM AND METHOD FOR MANAGING STORED-VALUE CARD DATA

(75) Inventors: Phillip Craig Graves, Atlanta, GA (US); Merrill Brooks Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 13 days.

(21) Appl. No.: 10/831,922

(22) Filed: Apr. 26, 2004

(65) Prior Publication Data

US 2004/0195316 A1 Oct. 7, 2004

Related U.S. Application Data

(63) Continuation of application No. 10/411,971, filed on Apr. 11, 2003, which is a continuation of application No. 09/641,363, filed on Aug. 18, 2000, now Pat. No. 6,575,361.
(60) Provisional application No. 60/149,740, filed on Aug. 19, 1999.

(51) Int. Cl.$^7$ .............................................. G06F 17/60
(52) U.S. Cl. ....................... 235/379; 235/383; 235/381; 235/487; 705/39; 705/40
(58) Field of Search ................................. 235/379, 383, 235/381, 487, 380, 375; 705/39, 40; 379/114.2; 709/217

(56) References Cited

U.S. PATENT DOCUMENTS

| | | | | |
|---|---|---|---|---|
| 5,577,109 A | * | 11/1996 | Stimson et al. | 379/114.2 |
| 5,777,305 A | * | 7/1998 | Smith et al. | 235/380 |
| 5,903,633 A | * | 5/1999 | Lorsch | 379/114.2 |
| 5,918,909 A | | 7/1999 | Fiala et al. | |
| 6,000,608 A | * | 12/1999 | Dorf | 235/380 |
| 6,185,545 B1 | | 2/2001 | Resnick et al. | |
| 6,189,787 B1 | * | 2/2001 | Dorf | 235/380 |
| 6,208,851 B1 | * | 3/2001 | Hanson | 455/405 |
| 6,282,566 B1 | * | 8/2001 | Lee et al. | 709/217 |
| 6,285,749 B1 | | 9/2001 | Manto | |
| 6,314,171 B1 | | 11/2001 | Dowens | |
| 6,315,206 B1 | | 11/2001 | Hansen et al. | |
| 6,333,976 B2 | * | 12/2001 | Lesley | 379/114.01 |
| 6,375,073 B1 | | 4/2002 | Aebi et al. | |
| 6,424,706 B1 | * | 7/2002 | Katz et al. | 379/144.01 |
| 6,434,379 B1 | | 8/2002 | Despres et al. | |
| 6,445,780 B1 | * | 9/2002 | Rosset et al. | 379/114.17 |

(Continued)

Primary Examiner—Thien M. Le
Assistant Examiner—Allyson N Trail
(74) Attorney, Agent, or Firm—Hunton & Williams LLP

(57) ABSTRACT

A computerized system and method for managing stored-value card data over a communications network between a plurality of terminals and a central processor is provided. Each of the terminals is accessible to respective users and is located in a respective location generally remote relative to the central processor. The stored-value card data is configured to securely process in real time stored-value cards transacted by respective users to enable charging prepaid stored-value services to a recipient of the transacted stored-value card. The method allows for providing a database coupled to the central processor. The method further allows for storing in the database a plurality of records comprising stored-value card data for each stored-value card. An associating step allows for associating in each stored record respective identifiers to uniquely match a respective stored-value card and a respective terminal. The associating step is enabled by assigning a "setup" card to the location and capturing the terminal information when a transaction utilizing that card is made. A transmitting step allows for transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

20 Claims, 5 Drawing Sheets

U.S. PATENT DOCUMENTS

| | | | |
|---|---|---|---|
| 6,575,361 B1 * | 6/2003 | Graves et al. | 235/380 |
| 6,588,658 B1 | 7/2003 | Blank | |
| 6,592,035 B2 | 7/2003 | Mandile | |
| 6,745,022 B2 | 6/2004 | Knox | |
| 2001/0023415 A1 | 9/2001 | Keil | |
| 2001/0042784 A1 * | 11/2001 | Fite et al. | 235/379 |
| 2002/0077076 A1 | 6/2002 | Suryanarayana et al. | |
| 2002/0101966 A1 | 8/2002 | Nelson | |
| 2002/0115424 A1 | 8/2002 | Bagoren et al. | |
| 2002/0119767 A1 | 8/2002 | Fieldhouse et al. | |
| 2002/0133457 A1 | 9/2002 | Gerlach et al. | |
| 2003/0028481 A1 * | 2/2003 | Flitcroft et al. | 705/39 |
| 2003/0055782 A1 * | 3/2003 | Slater | 705/39 |
| 2003/0194988 A1 | 10/2003 | Knox | |
| 2003/0205616 A1 * | 11/2003 | Graves et al. | 235/379 |
| 2003/0222135 A1 * | 12/2003 | Stoutenburg et al. | 235/379 |
| 2004/0118914 A1 * | 6/2004 | Smith et al. | 235/380 |

* cited by examiner

SYSTEM AND METHOD FOR MANAGING STORED-VALUE CARD DATA

RELATED APPLICATIONS

This application is a continuation of U.S. application Ser. No. 10/411,971, filed Apr. 11, 2003, which is a continuation of U.S. application Ser. No. 09/641,363 filed Aug. 18, 2000, now U.S. Pat. No. 6,575,361, which claimed priority to U.S. Provisional Application No. 60/149,740 filed Aug. 19, 1999, all of which are incorporated herein by reference in their entirety.

FIELD OF THE INVENTION

This invention relates to distributing and activating stored-value cards.

BACKGROUND OF THE INVENTION

The present invention is generally related to remote data management, and, more particularly, the present invention is related to system and method for managing stored-value card data between a plurality of users and a central processor over a communications network. The stored-value card data is indicative of services and/or products prepaid by the owner or end user of the card. Examples of prepaid services that may be accommodated by the stored-value data include long distance telephone communication, wireless communication, paging and internet-enabled communication services, including wireless Web access. Other examples of prepaid services and/or products that may be accommodated by the stored-value card may also include gift cards, prepaid gas cards, prepaid grocery cards, prepaid entertainment cards, customer rewards cards and any other type of stored-value cards for products, services, or both, that may be prepaid by the owner of the card.

Prepaid long distance phone cards are generally used in the telephone industry to allow customers to pre-purchase long distance calling time. Such cards are typically purchased in a predefined value. The card provides the customer with an amount of long distance calling time equal to the predefined value. The wireless, paging and internet cards are used to allow the customer to pre-purchase these services. Gift cards and other representations of stored-value cards allow the end-user to prepay for goods and/or services. The value is redeemed as these goods and/or services are delivered.

Each of the cards has an identification number printed and which identification could be magnetically stored therein. The identification number is also stored in a file in a database maintained by the card issuer. This file also stores the predefined value of the card. In the traditional business model, when the cards are sent to the retail location from which they will be sold the corresponding records in the database are activated, thus allowing the card to be used immediately by a customer. To use the card as a prepaid long distance card, the customer dials a toll free number to access the card issuer's system, enters the identification number, and then makes the desired long-distance call. During the call, the value of the card in the database is reduced as a function of phone charges accumulated during that call. When the value of the card is exhausted, the call terminates. If the customer ends the call before the value of the card is exhausted, the remaining value may be used for additional calls. Once the entire value of the card has been used, the card is discarded.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 by Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

U.S. Pat. No. 6,000,608 by Dorf provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to associate in the record of the phone card identifiers that uniquely match a respective phone card and a respective terminal so as to enhance detection of potential security breaches that could ensue in any system accessible to a large number of users. It would be further desirable to provide a system that allows for selectively processing stored-value card requests, such as stored-value card activation, deactivation, and/or incrementing, based on a table of predefined codes associated with respective user groups.

SUMMARY OF THE INVENTION

Generally speaking, the foregoing needs are fulfilled by providing in one exemplary embodiment a computerized method for managing stored-value card data over a communications network between a plurality of terminals and a central processor. Each of the terminals is accessible to respective users and is located in a respective location generally remote relative to the central processor. The stored-value card data is configured to securely process in real time stored-value cards transacted by respective users to enable charging prepaid stored-value services and/or products to a recipient of the transacted stored-value card. The method allows for providing a database coupled to the central processor. The method further allows for storing in the database a plurality of records comprising stored-value card data for each stored-value card. A processing step allows for processing a "setup" card assigned to that location through each terminal at that location to capture respective identifiers of each terminal, e.g., terminal electronic signature. An associating step allows for associating in each stored record the captured identifiers to uniquely match a respective stored-value card and a respective terminal. A transmitting step allows for transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

In another aspect thereof, the present invention further fulfills the foregoing needs by providing in another exemplary embodiment a computer-readable medium encoded with computer program code for managing stored-value card data over a communications network between a plurality of terminals and a central processor. Each of the terminals is accessible to respective users and located in a respective location generally remote relative to the central processor. The stored-value card data is configured to securely process in real time stored-value cards transacted by respective users to enable charging prepaid services and/or products to a recipient of the transacted stored-value card. The program code causes a computer to execute the following actions:

controlling a database coupled to the central processor;

storing in the database a plurality of records comprising stored-value card data for each stored-value card;

associating in each stored record respective identifiers to uniquely match a respective stored-value card and a respective terminal;

defining in each stored record a parameter corresponding to the face value of each respective stored-value card; and processing a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

In yet another aspect thereof, the present invention fulfills the foregoing needs by providing a system for managing stored-value card data over a communications network between a plurality of terminals and a central processor. Each of the terminals is accessible to respective users and located in a respective location generally remote relative to the central processor. The stored-value card data is configured to securely process in real time stored-value cards transacted by respective users to enable charging prepaid services and/or products to a recipient of the transacted phone card. The system in one exemplary embodiment comprises a database coupled to the central processor. A storage control module is configured to store in the database a plurality of records comprising stored-value card data for each stored-value card. An associating module is configured to associate in each stored record respective identifiers to uniquely match a respective stored-value card and a respective terminal. A value module is configured to define in each stored record a parameter corresponding to the face value of each respective stored-value card. A first processing module is configured to process a request of stored-value card activation to the central processor from a respective requesting terminal. The central processor is configured to accept said activation request based on whether the associated identifiers for the stored-value card to be activated match identifiers actually transmitted by the requesting terminal for that stored-value card and terminal and wherein the request for stored-value card activation enables to associate a value for the card to be activated solely based on the parameter corresponding to the face value for that card. A second processing module is configured to process a request for incrementing the value associated with a respective stored-value card. That request is transmitted to the central processor from a respective requesting terminal. The central processor is configured to accept that increment request based on whether the respective identifiers stored in the record for the stored-value card whose associated value is to be incremented match identifiers actually transmitted by the requesting terminal for that stored-value card and terminal and wherein the incrementing request is solely based on multiples of the parameter corresponding to the face value of that stored-value card.

Figure 1:
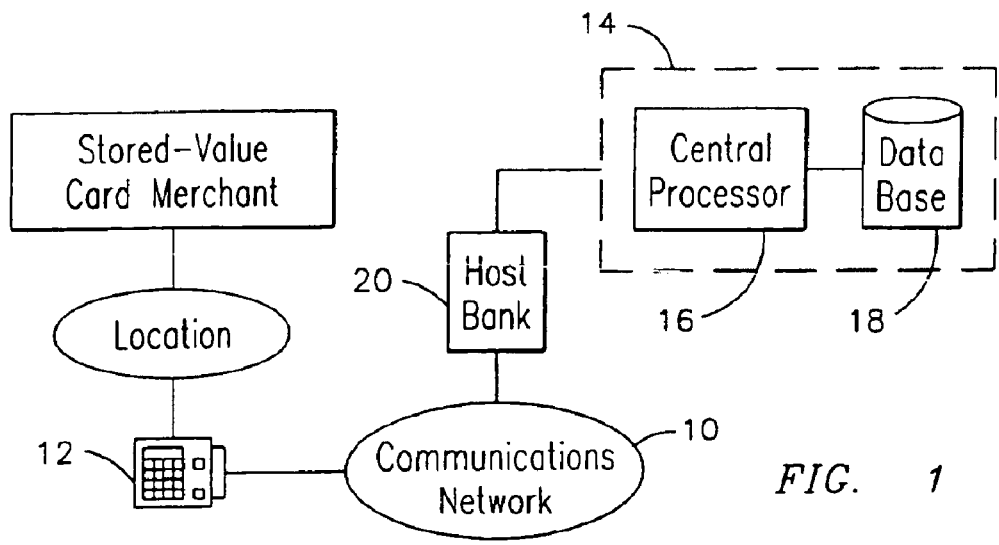
FIGS. 1–5 respectively illustrate schematic block diagrams showing various exemplary stored-value card user trees that as shown in FIGS. 1–3 may be connected via a communications network to a remote stored-value card data management system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF EXEMPLARY EMBODIMENTS

Glossary

Customer/Distributor. A customer/distributor is a customer of the assignee of the present invention who performs the role of distributor by managing a set of stored-value cards and subordinate entities that use the stored-value card data management system of the present invention.

Merchant. A merchant is a stored-value card-selling business unit or business chain that can be subordinate to other merchants, or have other merchants subordinate to it. An arbitrary number of hierarchy levels and branching complexity can be supported at the merchant level. In one illustrative embodiment, the database is implemented to support up to eight merchant levels in order to conveniently halt excessive tree recursion in the case of circular or lost dependencies. It will be appreciated, however, that each database element may be designed to permit the number of levels to be extended beyond eight by the change of a single parameter in any given element.

Location. A location is a business unit, typically a single physical store, subordinate to a single merchant, which owns one or more terminals. Setup cards associate authorized terminals with specific locations upon such cards being swiped at a designated terminal. Any authorized terminal at a location can activate any Fastcard$^{SM}$ stored-value card assigned to that location. Locations do not necessarily identify unique geographic locations (although typically they do). However, setup cards uniquely identify locations.

Terminal. A terminal is a physical credit or debit-card terminal. A terminal is subordinate to one and only one location. A location can own one or more terminals.

Setup Cards. Setup cards include a unique encoded control number, but no denomination value, and are used to identify merchant locations with a set of stored-value cards to be activated, deactivated, or incremented. Once associated with a location, setup cards can identify and create authorized terminals via the credit or debit card-like data obtained from a swiping action through each respective terminal at the associated location. This process is used to capture identifiers, e.g., electronic signature of the terminal, that enable identification of terminals authorized to process stored-value cards assigned to that location, preventing unauthorized terminals from gaining access.

Standard Telecommunications Cards. Standard telecommunications cards include a unique encoded control number, a value, and are only allowed to be activated by terminals at a particular location. Standard cards are available in currency or unit denominations. Standard cards are reported at the terminal level if activated via a swipe, or at an assigned location or merchant entity if activated over the web.

Prepaid Wireless cards. Prepaid wireless cards include a unique encoded control number, a value for wireless calling time, and are only allowed to be activated by terminals at a particular location. Prepaid Wireless cards are available in currency or unit denominations. Prepaid Wireless cards are reported at the terminal level if activated via a swipe, or at an assigned location or merchant entity if activated over the web.

Prepaid Paging cards. Prepaid paging cards include a unique encoded control number, a value for paging units, and are only allowed to be activated by terminals at a particular location. Prepaid paging cards are available in currency or unit denominations. Prepaid paging cards are reported at the terminal level if activated via a swipe, or at an assigned location or merchant entity if activated over the web.

Prepaid Internet access cards. Prepaid Internet access cards include a unique encoded control number, a value for Internet access time, and are only allowed to be activated by terminals at a particular location. Prepaid Internet access cards are available in currency or unit denominations. Prepaid Internet access cards are reported at the terminal level if activated via a swipe, or at an assigned location or merchant entity if activated over the web.

Promotional Telecommunications Cards. Promotional telecommunications cards include a unique encoded control number, a value, and can be activated from any terminal by using a predefined denomination code, e.g., one cent. Promotional cards are available in currency or unit denominations. Promotional cards are not reported with any entity.

Gift Stored-value Cards. Gift stored-value cards include a unique encoded control number and value. Gift cards are available in currency or unit denominations.

Sales Stored-value Cards. Sales cards are like promotional cards in that they can be activated by any terminal. The distinction relative to promotional cards is that sales cards are reported at their respective owning entity.

Introduction

In one exemplary embodiment, the system for managing stored-value card data may interface with any of the above-identified entities, which form a set of trees, with one customer/distributor at a top layer, an intermediate layer of one or more merchants above a layer of locations. A bottom layer of terminals is below the layer of locations.

FIGS. 1–5 illustrate examples of entity trees that may benefit from the system and techniques of the present invention. For simplicity of illustration, the customer/distributor layer at the top is omitted. Each distributor can have subordinate to it any of the illustrated types of structures. Note that in each case, a merchant is at the top, with a layer of locations just above a layer of terminals.

The assignee of the present invention may issue from time to time prepaid stored-value cards that may carry information encoded on a magnetic stripe such as may be used in credit or debit card transactions. The stored-value card is analogous to a valid credit or debit card, with no monetary value until activated. As used herein, the term stored-value card refers to a medium, generally made of plastic or any other light and durable material and typically having a credit-card size that enables its owner or end user to obtain one or more prepaid stored-value services, products, or both, such as long distance telephone communication, wireless communication, paging, internet-enabled communication services, including wireless Web access, and any other stored-value of prepaid services and/or products that may be provided to end users of the card. Other examples of prepaid services and/or products that may be accommodated in the stored-value card may also include gift cards, prepaid gas cards, prepaid grocery cards, prepaid entertainment cards, customer rewards cards and any other type of stored-value cards for products, services, or both, that may be prepaid by the owner of the card.

Figure 2:
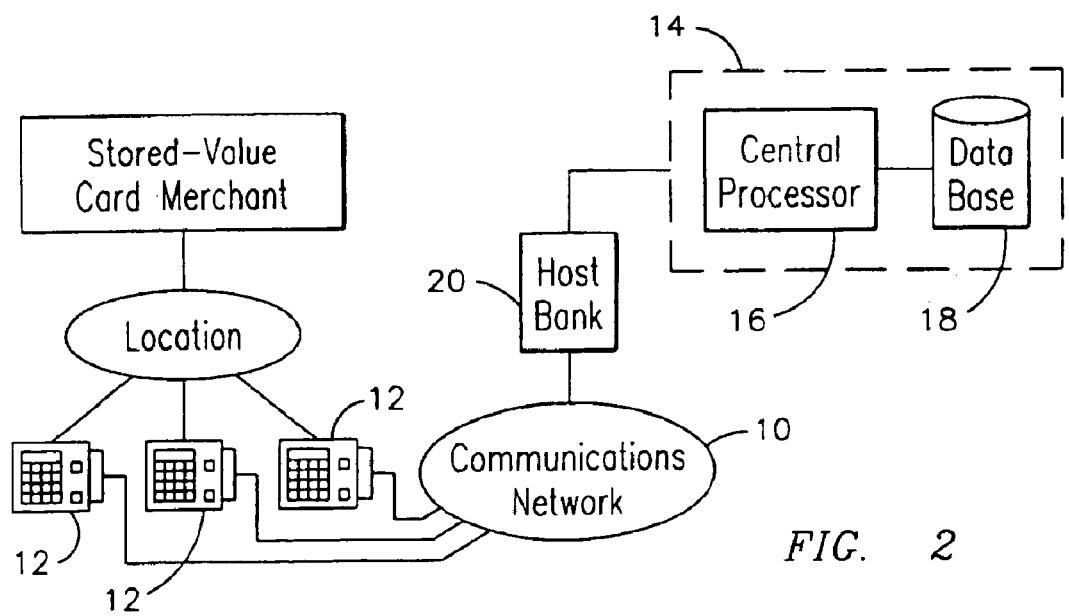
Figure 3:
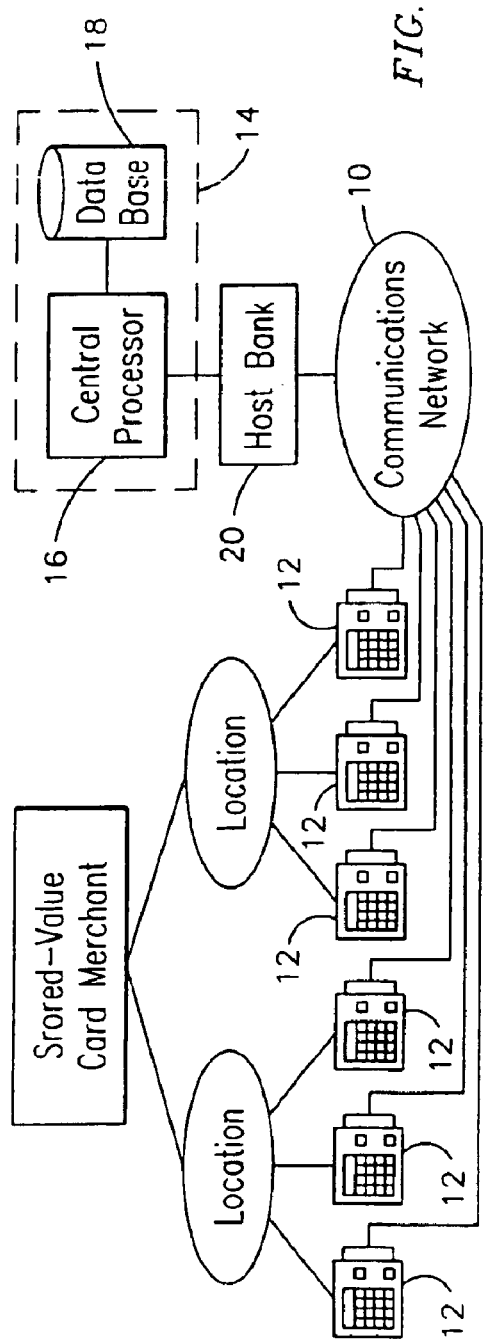
Figure 4:
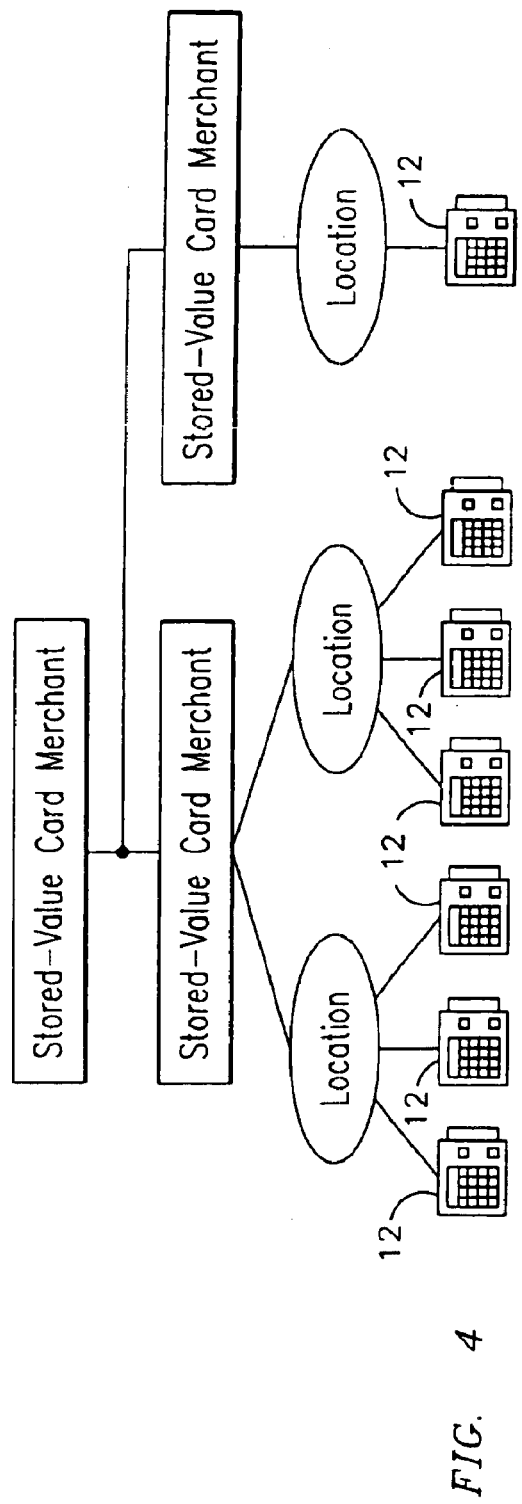
Figure 5:
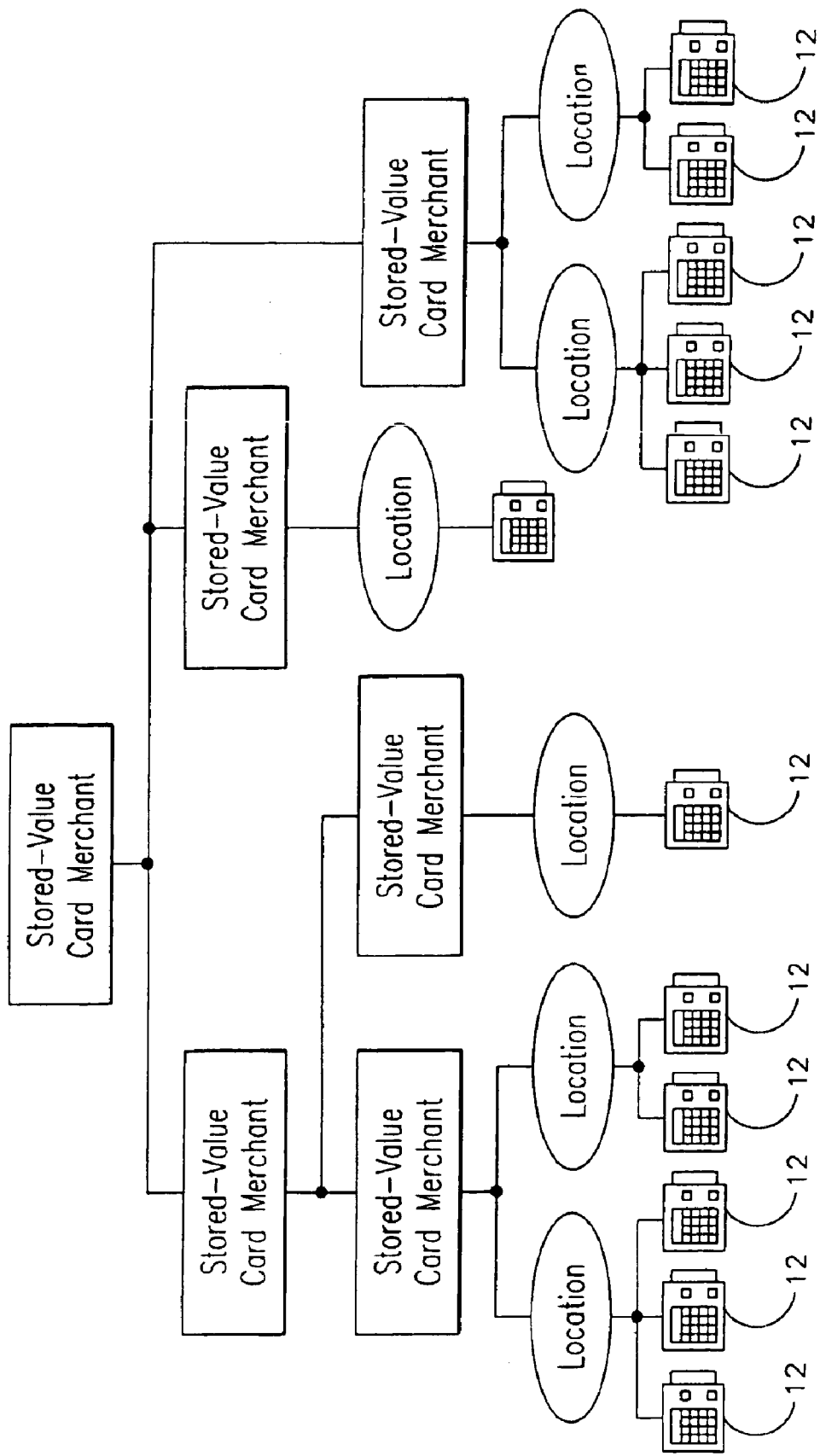

As shown in FIGS. 1 through 3, by way of a communications network 10, e.g., a phone network, credit or debit card network, the Internet, an intranet, etc., over which credit or debit card transactions are authorized or denied, a point-of-sale terminal 12, e.g., a credit or debit card terminal, is used to send an authorization request to a stored-value card data management system 14, such as may be managed and operated by the assignee of the present invention. System 14 comprises a central processor 16 coupled to a database 18 that stores a plurality of records including stored-value card data for each stored-value card issued by the assignee of the present invention. It will be appreciated that in the case of a credit or debit card network each stored-value card transaction request is expected to be handled, on average, within approximately two seconds, or one could lose its certification to use that network. For the sake of simplicity of illustration, blocks representing the stored-value card data management system and other associated blocks are not shown in the user entity trees shown in FIGS. 4 and 5. It will be appreciated, however, that each of such user entity trees will be similarly interconnected to the stored-value card data management system as exemplarily illustrated in FIGS. 1 through 3 or as further described below.

In one aspect of the present invention, the stored-value card may only be authorized if the request is made by any of a set of designated terminals. These terminals will be associated with respective identifier numbers by an associating module configured to associate in each stored record respective identifiers to uniquely match a respective stored-value card and a respective terminal.

A respective requesting terminal, using the communications network, may send an authorization request through a suitable host bank 20 to the central processor. FIGS. 1 through 3 show an exemplary link architecture between the communications network and the central processor through the host bank, that is, the link architecture allows communication of card-related data from the merchant, to the communications network, which in one exemplary embodiment would be the Visa network if this was a Visa-routed transaction, to the host bank, and then to the central processor. It will be appreciated that other link architectures may be implemented, such as a host-to-host architectural connection. In this case, the communications network, such as a dedicated link or the internet, would be directly between a merchant's "host" system and a "host" system of the assignee of the present invention. Thus, the present invention is not limited to applications that require a host bank being that a host-to-host connection does not require any host bank or Visa network to transfer the card-related data to the central processor.

The authorization request includes information about the card swiped and the terminal used to swipe it, such as the electronic signature of that terminal. A processing module configured to process a request of stored-value card activation will analyze this data and send back either an authorization or a disapproval to the requesting terminal. If authorized, a database coupled to the central processor will be updated to reflect any authorization or disapproval.

In another aspect of the system of the present invention, merchants and terminals can be divided into groups, membership of which varies depending on whether the context of the grouping is for the purpose of executing any specific action out of a set of actions that a respective user may execute, such as card activation, billing, commission payments, reporting, inventory management, etc. For example, terminal A from Merchant X may be in activation group I with terminal B from merchant Y, yet for billing purposes the two terminals may be in different groups. Management and definition of these groups is the responsibility of a module configured to store in the database a table indicative of the set of actions that a respective user may execute from a respective terminal.

In one exemplary embodiment, requests in connection with the stored-value card data management process may include three basic actions: stored-value card activation, deactivation, and incrementing. These requests may be selectively encoded so as to be differentiated by the transaction amount received from the host back in the authorization packet. The transaction amount would thus comprise predefined codes that may be stored in a table of predefined codes stored in the database. Such codes may then be associated with respective user groups. It will be appreciated that the transaction amounts, i.e., predefined codes and their interpretations will vary from merchant to merchant. For example, for merchants A and C, the requests may be encoded so that a stored-value card activation request has the form $0.01, a deactivation request has the form $0.02, and an incrementing request will have the form $0.03. On the other hand, for merchant B, a code of the form $2.00 may indicate a stored-value card activation request, a code of the form $3.00 may indicate a deactivation request, and a code of the form $4.00 may indicate a request for incrementing the value associated with the stored-value card by an amount equal to the original value of that card. For security purposes, regardless of the interpretations for each merchant, $1.00 cannot be used for any code.

As suggested above, there may be various categories of stored-value cards, such as standard telecommunications cards, setup cards, gift cards, sales cards, promotional cards, etc. These cards are differentiated by the unique encoded control number for the card. The stored-value cards identified as standard stored-value cards are the actual stored-value cards marketed by the assignee of the present invention as Fastcard[SM] stored-value cards.

Node Organization

For consistency in the database controlled by the central processor, hierarchical relationships between distributors, merchants, locations and terminals are configured to reflect the actual business relationships therebetween. As suggested above, distributors, locations, and terminals may comprise a single flat layer, while merchants can have any number of nesting levels.

To organize this structure in the database, each entity in this hierarchy can be uniquely specified by providing two data elements, such as the node ID and the node type. The node ID of any entity is the unique key in a node's table, while the node type identifies a table for that node. For example, the NodeTypes table defines the node types associated with each table. In one exemplary embodiment, the set of defined node types are as follows:

0—Global/User
1—Customer/Distributor
2—Merchant
3—Location
4—Terminal

It will be appreciated that the present invention need not be limited to the above-illustrated organization since other node types could be implemented, if so desired.

The combination of node ID and node type define the scope, or domain, of a given section of the tree. Users and cards are assigned to a particular node on the tree, which allows stored-value card data management to be processed unambiguously. It will be appreciated by those skilled in the art, that use in the system use this scoping technique enables to substantially filter out forbidden user actions.

Any system user is assigned to a specific node, known as that user's root. The user's root determines the entities that the user is allowed to manipulate. A global user can manipulate any entity in the database, while a user assigned a terminal root can only manipulate that terminal.

Users are also assigned a set of discrete privileges. These privileges determine what actions can be performed by that user. For example, a user with a Create Locations privilege is allowed to create locations, provided that the user also is assigned to a merchant level root or higher.

Reporting

Reports may be available by terminal, by location, and/or by any merchant/distributor level in the hierarchy. Regardless of the starting point in the hierarchy, reports may be available at any level of aggregation below the starting point.

Denomination Coding

All request actions to be performed during the activation process, as well as the valid range of values for these actions, may be encoded in a single 8-character denomination field available in the communication network. As suggested above, for each merchant or user group there may be defined a set of codes that can be used to process activations, deactivations, and stored-value cards incrementing. These codes may be defined through the use of the string codes and masks as further described below.

String Codes

In one exemplary embodiment, the following string codes are used:

TABLE 0-1

Denomination String Codes

| Code | Interpretation |
| --- | --- |
| 0 | Position is a zero |
| X | Position is undefined, any value is valid |
| A | Position is part of an action field |
| V | Position is part of a value field |
| M | Position is part of a macro field |

The string codes may be used to define a denomination mask, as defined below. Note that by way of example there may be three field types: actions, values, and macros.

An action field indicates a value-free action to be performed, where the value is specified in an accompanying value field. A macro field combines knowledge of action and value into one field.

Masks

Using the foregoing exemplary string codes, it is then possible to define fields in a mask, which will then be decoded to perform the appropriate action on an arriving denomination field. There may be a few rules to be applied to defining a mask, such as the following exemplary rules:

Mask Rule 1. All eight characters of the denomination field should be accounted for. The "0" and the "X" string codes allow unused characters to be filled with placeholders. Example: "0000VVAA" is a valid mask, whereas "VVAA" is not.

Mask Rule 2. A mask may contain either a) one A field and one V field, or b) one M field. Example: "0000VVAA" is a valid mask, as is "0000XXMM", but "0000VVMM", "0000AA00", or "0000MMAA" are not.

Mask Rule 3. All characters forming an A, V, or M field should be contiguous. 0 and X characters can be sprinkled in as needed. Example: "00AA0VVV" and "00AAAVVV" are valid masks, whereas "A0AAVV00" is not.

EXAMPLE 1

Assuming a merchant is assigned the following codes:

"00000001" will activate a card, regardless of denomination

"00000002" will deactivate a card, regardless of denomination

"00000003" will refresh the card with the card's face value

Then, as the action and the value to be used are intermingled, the proper mask for this merchant would be "0000000M", where the M field can be 1, 2, or 3. In this case, there is no value to be validated, yet for case 3, the card's own face value is used to increment value A different mask may consist of:

"00000200" will activate a card, regardless of denomination

"00000300" will deactivate a card, regardless of denomination

"00000400" will refresh the card with the card's face value

Mask Design

During the design of a mask for each customer, the following issues should be addressed. First, whether any zeros or "Don't Care" characters should be defined.

Next, it should be determined whether an action/value mask or a macro mask should be used. To decide, determine whether the value field in the denomination code can be separated from the action field. If they can be separated, then the mask is an action/value mask. If the action and the value are intimately related, then the mask is a macro mask.

Action/Value Mask Design

With an action/value mask, the set of action codes for activation, deactivation, and increment should be selected.

With the increment action for a stored-value card, the relationship between the value field, the card's face value, and the value to increment the value of the stored-value card will have the following relationship: The card's face value is used to increment the value of the card, regardless of the value field.

Macro Mask Design

With a macro mask, the set of action codes and their associated values may be created. The logical decisions involved closely mirror those for the action/value mask, except that it may not be possible to validate the value field with the card's face value, as the value field does not exist. Viewed this way, the possible masks are a subset of the action/value masks without any validation. For example, for activation and deactivation, two macro codes may be assigned, one for each action. For incrementing the value of the stored-value card, a unique macro code may be assigned to correspond to the value to be placed on the card. It will be appreciated that if it is desired to only refresh with the card's face value, then a single code may be assigned for incrementing the value of the stored-value card. Once the foregoing logical decisions are made, the a mask builder module can be used to construct the database records necessary to allow proper validation and actions by the users of the stored-value card data management system.

Exemplary Implementation

The foregoing discussion sets forth the view of the masks from the system user's perspective. Internally, an activator module behaves as if all masks are macros, where the action and value fields form a "macro mask", hence the term. So, it may be helpful for the system to process a user's specification of the action/value fields and convert them to an enumeration of all valid cases, using the concatenation of the action and value fields, preferably in that order, to form the macro key.

To prevent such enumerations from becoming too populous, it may be helpful to constrain the multiplier, increment, and maximum value parameters. In one exemplary embodiment, these parameters will be mutually constrained to allow a maximum of 128 action/value combinations to be defined, including activation and deactivation. Alternatively, a maximum of 128 macro actions could be defined, including activation and deactivation. In practical terms, however, it is believed than less than a dozen should prove sufficient.

Figure 6:
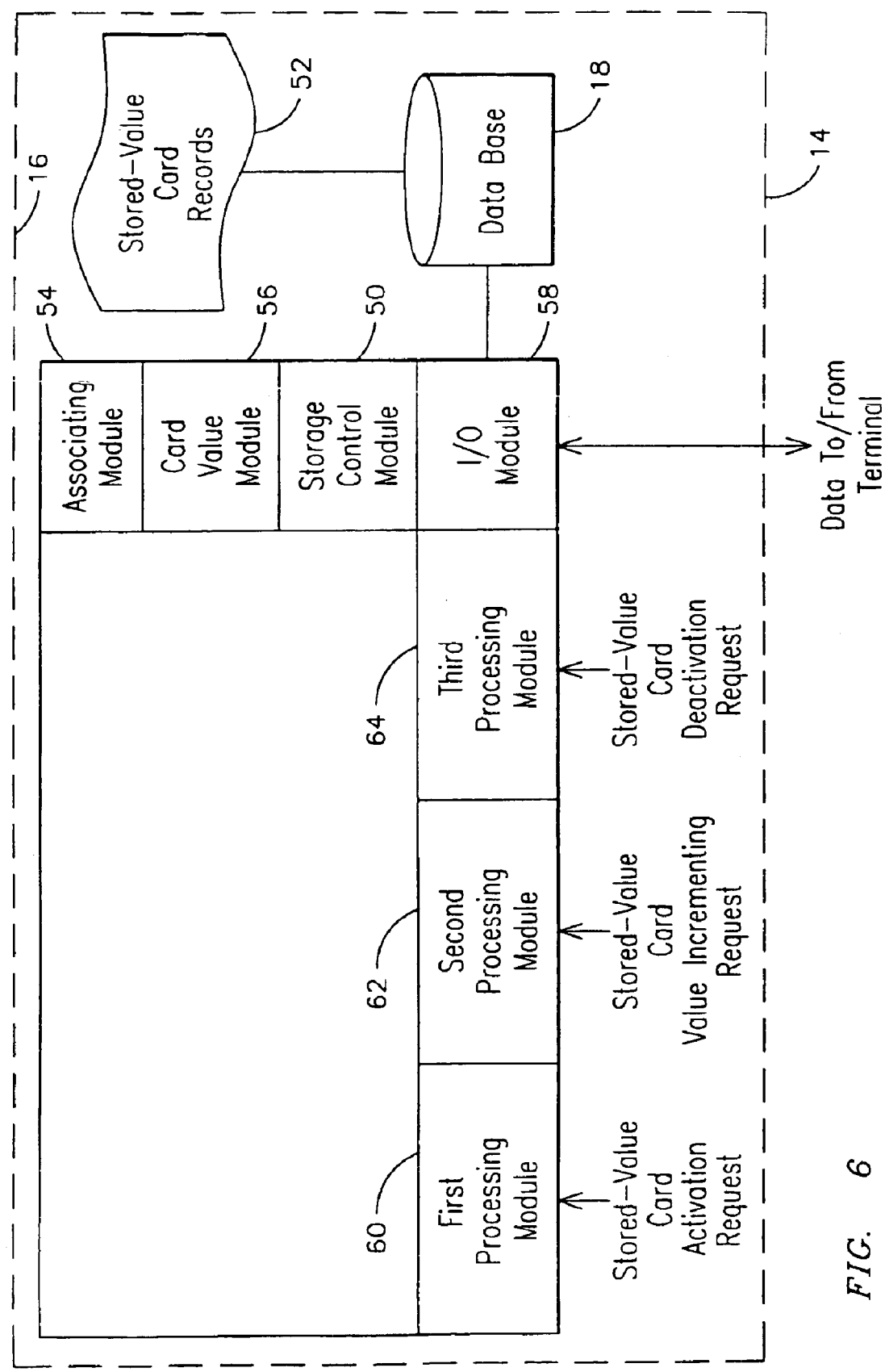
FIG. 6 is an exemplary modular architecture of the telecommunications card data management system shown in FIGS. 1–3.

FIG. 6 illustrate further details in connection with stored-value card data management system 16. As shown in FIG. 6, central processor 16 includes a storage control module 50 that allows for storing in database 18 a plurality of records 52 comprising stored-value card data for each stored-value card. An associating module 54 allows for associating in each stored record respective identifiers that uniquely match a respective stored-value card and a respective terminal. A value module 56 allows for defining in each stored record a parameter corresponding to the face value of each respective stored-value card. That parameter could comprise a monetary amount corresponding to the face value of each respective stored-value card or such parameter could comprise time units corresponding to the face value of each respective stored-value card, or both. Stored-value card data transmitted over the communications network may be received by input/output module 58 so that a first processing module 60 may process a request of stored-value card activation to the central processor from a respective requesting terminal. The central processor thus allows for accepting or declining the activation request based on whether the associated identifiers for the stored-value card to be activated match the identifiers actually transmitted by the requesting terminal for that stored-value card and terminal. As suggested above, the request for stored-value card activation enables to associate a value for the card to be activated and that value is preferably solely based on the parameter corresponding to the face value for that card.

As further shown in FIG. 6, a second processing module 62 allows for processing a request for incrementing the value associated with a respective stored-value card. The request is transmitted over the communications network to the central processor from a respective requesting terminal. The central processor thus further allows for accepting or declining the increment value request based on whether the respective identifiers stored in the record for the stored-value card whose associated value is to be incremented match the identifiers actually transmitted by the requesting terminal for that stored-value card and terminal. As suggested above, the incrementing request may be solely based on multiples of the parameter corresponding to the face value of that stored-value card. A third processing module 64 allows for processing a request of stored-value card deactivation to the central processor from a respective requesting terminal. In this case, the central processor is configured to accept or decline the deactivation request based on whether the respective identifiers stored in the record for the stored-value card to be deactivated match the identifiers actually transmitted by the requesting terminal for that stored-value card and terminal.

The storage control module may be programmed to store in the database a table indicative of a set of actions that a respective user may execute from a respective terminal. The set of actions that may be executed by that respective user corresponds to a predefined hierarchy table stored in the database for that user.

Figure 7:
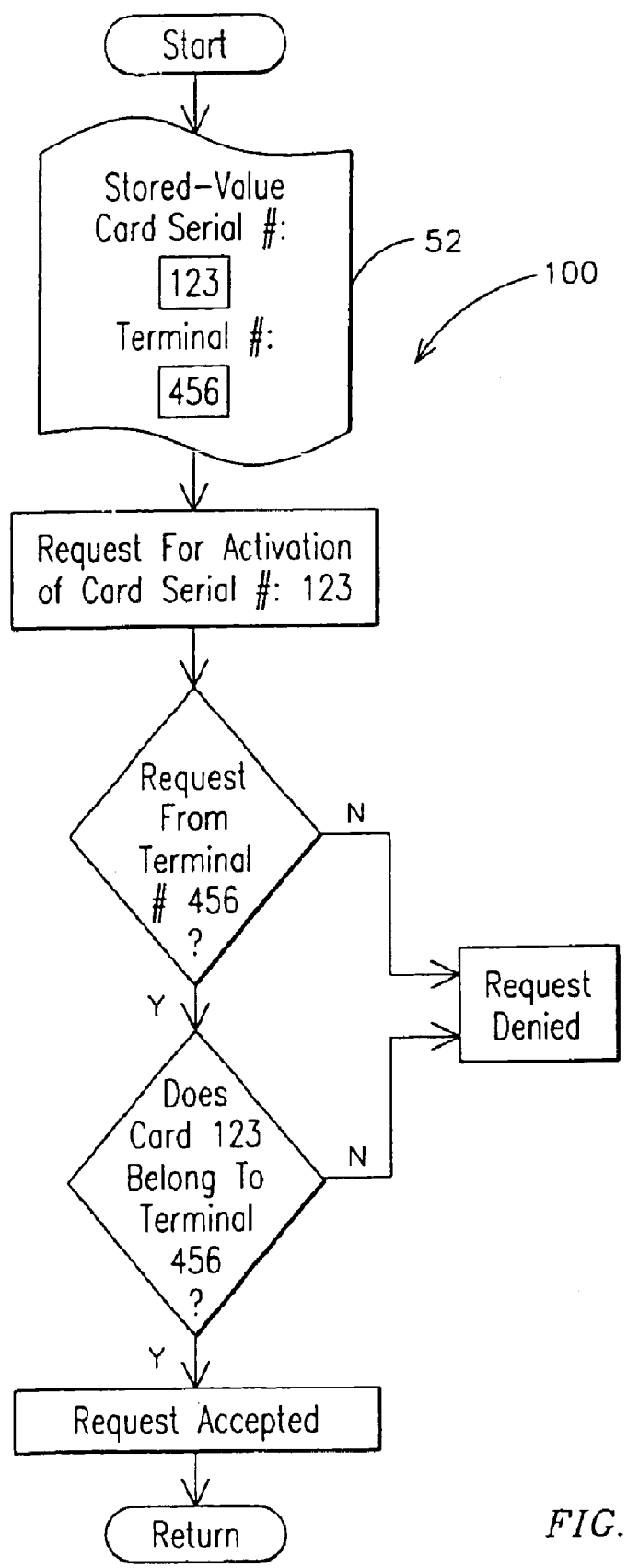
FIG. 7 is an exemplary flow chart illustrating one aspect of the present invention as may be implemented by the system of FIG. 6.

FIG. 7 illustrates an exemplary flow chart 100 such as may be implemented by a stored-value card data management system embodying one aspect of the present invention. As shown in FIG. 7, assuming that in a given stored-value card record, a stored-value card serial No. 123 is associated with terminal No. 456, then a request for activation of stored-value card serial No. 123, may be processed as follows: A verification module would allow for determining whether that request came from terminal No. 456. If the verification module determines that in fact such request was generated from terminal No. 456, and card 123 has been assigned to the location containing terminal 456, then the central processor would generate a message indicating that the request has been accepted. If the verification module determines that the requesting is other than terminal No. 456, or if the card is not assigned to the location, then a message would be issued declining the transaction.

The stored-value card data management system in one exemplary embodiment enables a web-based, ID and password protected application available to anyone with internet access and the appropriate ID and Password. As described-above, the system comprises respective modules for card generation, merchant establishment, location establishment, terminal setup by assigning setup cards to a location, and inventory assignment to merchants and/or locations. The system may also used for other card-related actions, such as web-based activation, deactivation and refresh. The system further comprises a reporting engine that allows for generating reports for sales analysis, inventory control and billing. The system further comprises a trouble-shooting interface with visibility into each transaction, card, location, terminal and merchant. In operation, the system comprises an automated card replenishment system, keeping track of any unactivated card inventory at a location and alerting the appropriate individual when the inventory falls below a predefined level.

As will be appreciated by those skilled in the art, in a major credit card network, merchants will generally reconcile their report of transactions based on their credit card terminal against the acquiring banks report of transactions. When processing activation of cards on the Fastcard system, the transaction may appear like a standard credit card transaction to the merchant's terminal. The bank, however, does not see a Fastcard transaction as a standard transaction, and does not process it. This could potentially cause a discrepancy when the report from the terminal and the report from the bank do not agree. To eliminate this discrepancy, the Fastcard system is configured to change its response to the transaction request to a decline message. By way of example, there may a plurality of distinct decline messages, e.g., more than 50 different decline messages, the system can send, and one can choose a decline message that is a unique message on a given merchant's terminal. Thus, the merchant may be readily trained to view this unique decline message as an indication that the activation of the card is successful. In operation, when the system responds with that unique decline message, the bank does not view this as a real transaction, thus eliminating the reconciliation issue. As suggested above, the Fastcard system has the capability of custom tailoring the response sent back to the merchant on a location by location basis.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

An exemplary data structure and detailed tables implemented in the stored-value card data management of the system of the present invention is described in U.S. Pat. No. 6,575,361, which is incorporated herein by reference in its entirety.

What is claimed is:

1. A computerized method for managing stored-value card data over a communications network between a plurality of terminals and a central processor, each of said terminals accessible to respective users and located in a respective location generally remote relative to the central processor, the stored-value card data configured to securely process stored value cards transacted by respective users to enable charging prepaid services and/or products to a recipient of the transacted stored-value card, the method comprising:

providing a database coupled to the central processor;

storing in the database a plurality of records comprising stored-value card data for each stored-value card;

processing respective terminal identifiers for each of the plurality of terminals;

associating in the database a specific stored-value card with one or more of the plurality of terminal identifiers; and receiving at the central processor a request to activate the specific stored-value card, the activation request being received from a first requesting terminal and comprising a first requesting terminal identifier, wherein the central processor is configured to accept said activation request based on whether the first requesting terminal identifier matches one of the one or more of the plurality of terminal identifiers associated with the specific stored-value card in the database.

2. The computerized method of claim 1 wherein each of the plurality of terminal identifiers comprises a respective electronic signature for each corresponding terminal.

3. The computerized method of claim 1 wherein each record stored in the database further includes a parameter indicative of a predefined amount corresponding to the face value of each stored-value card.

4. The computerized method of claim 1 further comprising:
receiving at the central processor a request for incrementing a value associated with the specific stored-value card, said incrementing request being received from a second requesting terminal and comprising a second requesting terminal identifier, wherein the central processor is configured to accept said incrementing request based on whether the second requesting terminal identifier matches one of the one or more of the plurality of terminal identifiers associated with the specific stored-value card in the database.

5. The computerized method of claim 1 further comprising:
receiving at the central processor a request to deactivate the specific stored-value card, said deactivating request being received from a third requesting terminal and comprising a third requesting terminal identifier, wherein the central processor is configured to accept said deactivating request based on whether the third requesting terminal identifier matches one of the one or more of the plurality of terminal identifiers associated with the specific stored-value card in the database.

6. The method of claim 1, wherein the stored-value card to be activated may be used for long distance telephone communication.

7. The method of claim 1, wherein the stored-value card to be activated may be used for wireless communication.

8. The method of claim 1, wherein the stored-value card to be activated may be used for paging.

9. The method of claim 1, wherein the stored-value card to be activated may be used for internet-enabled communication service.

10. The method of claim 1, wherein the stored-value card to be activated may be used for wireless web access.

11. The method of claim 1, wherein the stored-value card to be activated is a gift card.

12. The method of claim 1, wherein the stored-value card to be activated is a prepaid gas card.

13. The method of claim 1, wherein the stored-value card to be activated is a prepaid grocery card.

14. The method of claim 1, wherein the stored-value card to be activated is a prepaid entertainment card.

15. The method of claim 1, wherein the stored-value card to be activated is a customer reward card.

16. The method of claim 1, further comprising generating reports of transmitted requests of stored-value card activation.

17. The method of claim 1, wherein the transmitted request of stored-value card activation from the terminal is first transmitted to a host bank before the request is transmitted to the central processor.

18. A computer-readable medium encoded with computer program code for managing stored-value card data over a communications network between a plurality of terminals and a central processor, each of said terminals accessible to respective users and located in a respective location generally remote relative to the central processor, the stored-value card data configured to securely process stored-value cards transacted by respective users to enable charging prep aid services and/or products to a recipient of the transacted stored-value card, the program code causing a computer to execute a method comprising:
controlling a database coupled to the central processor;
storing in the database a plurality of records comprising stored-value card data for each stored-value card;
processing respective terminal identifiers for each of the plurality of terminals;
associating in the database a specific stored-value card with one or more of the plurality of terminal identifiers; and
receiving at the central processor a request to activate the specific stored-value card, the activation request being received from a first requesting terminal and comprising a first requesting terminal identifier, wherein the central processor is configured to accept said activation request based on whether the first requesting terminal identifier matches one of the one or more of the plurality of terminal identifiers associated with the specific stored-value card in the database.

19. A system for managing stored-value card data over a communications network between a plurality of terminals and a central processor, each of said terminals having a terminal identifier and being accessible to respective users and located in a respective location generally remote relative to the central processor, the stored-value card data configured to securely process stored-value cards transacted by respective users to enable charging prep aid services and/or products to a recipient of the transacted stored-value card, the system comprising:
a database coupled to the central processor;
a storage module configured to store in the database a plurality of records comprising stored-value card data for each stored-value card;
an associating module configured to associate in each stored record a respective stored-value card and at least one terminal identifier;
a value module configured to define in each stored record a parameter corresponding to the face value of each respective stored-value card;
a first processing module configured to receive and process a request of stored-value card activation from a first requesting terminal, the activation request comprising a first requesting terminal identifier, the central processor being configured to accept said activation request based on whether the first requesting terminal identifier matches one of the at least one terminal identifier associated with the specific stored-value card in the database.

20. The system of claim 19 further comprising:
a second processing module configured to receive and process a request for incrementing a value associated with the specific stored-value card, said incrementing request being received from a second requesting terminal and comprising a second requesting terminal identifier, wherein the central processor is configured to accept said incrementing request based on whether the second requesting terminal identifier matches one of the at least one terminal identifier associated with the specific stored-value card in the database.

* * * * *